United States Patent
Yang

(10) Patent No.: US 10,707,457 B2
(45) Date of Patent: Jul. 7, 2020

(54) BATTERY CASE AND ROBOT HAVING THE SAME

(71) Applicant: UBTECH Robotics Corp, Shenzhen (CN)

(72) Inventor: Gao Yang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 185 days.

(21) Appl. No.: 16/140,565

(22) Filed: Sep. 25, 2018

(65) Prior Publication Data

US 2019/0131599 A1 May 2, 2019

(30) Foreign Application Priority Data

Oct. 26, 2017 (CN) .......................... 2017 1 1018778

(51) Int. Cl.
*H01M 2/10* (2006.01)
*B25J 9/00* (2006.01)
*H01M 2/02* (2006.01)
*H01M 10/42* (2006.01)

(52) U.S. Cl.
CPC ......... *H01M 2/1016* (2013.01); *B25J 9/0009* (2013.01); *H01M 2/0212* (2013.01); *H01M 10/425* (2013.01); *H01M 2/1061* (2013.01); *H01M 2/1072* (2013.01)

(58) Field of Classification Search
None
See application file for complete search history.

(56) References Cited

U.S. PATENT DOCUMENTS

| 9,808,246 | B2 * | 11/2017 | Shelton, IV | ......... A61B 17/068 |
| 2002/0081937 | A1 * | 6/2002 | Yamada | .................... A63H 3/48 |
| | | | | 446/175 |
| 2018/0175347 | A1 * | 6/2018 | Ninomiya | ........... H01M 2/0217 |

* cited by examiner

Primary Examiner — Tracy M Dove

(57) ABSTRACT

A battery case for a robot has a housing and an end cap. The housing defines a chamber for receiving a battery therein. The chamber has an open end. The end cap includes a cap that is used to cover the open end, a rotatable post rotatably passing through the cap and extending into the chamber, an elastic member arranged around the rotatable post and comprising an end abutting against the cap, and a locking member connected to the rotatable post and rotatable together with the rotatable post to a position where the locking member is engaged with the housing, thus locking the cap to the housing.

10 Claims, 5 Drawing Sheets

BATTERY CASE AND ROBOT HAVING THE SAME

CROSS REFERENCE TO RELATED APPLICATIONS

This application claims priority to Chinese Patent Application No. 201711018778.5, filed Oct. 26, 2017, which is hereby incorporated by reference herein as if set forth in its entirety.

BACKGROUND

1. Technical Field

The present disclosure generally relates to robots, and particularly to a battery case and a robot.

2. Description of Related Art

Some conventional robots use rechargeable batteries as power source. Some of the rechargeable batteries are built into the robots and cannot be removed from the robots. Since the batteries cannot be replaced by a user with a fully charged battery, when the power goes out, the robot has to be charged and the charging process usually lasts about several hours. Thus, it is useful and desirable to provide a battery case that allows batteries to be easily installed/removed.

BRIEF DESCRIPTION OF THE DRAWINGS

Many aspects of the present embodiments can be better understood with reference to the blowing drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
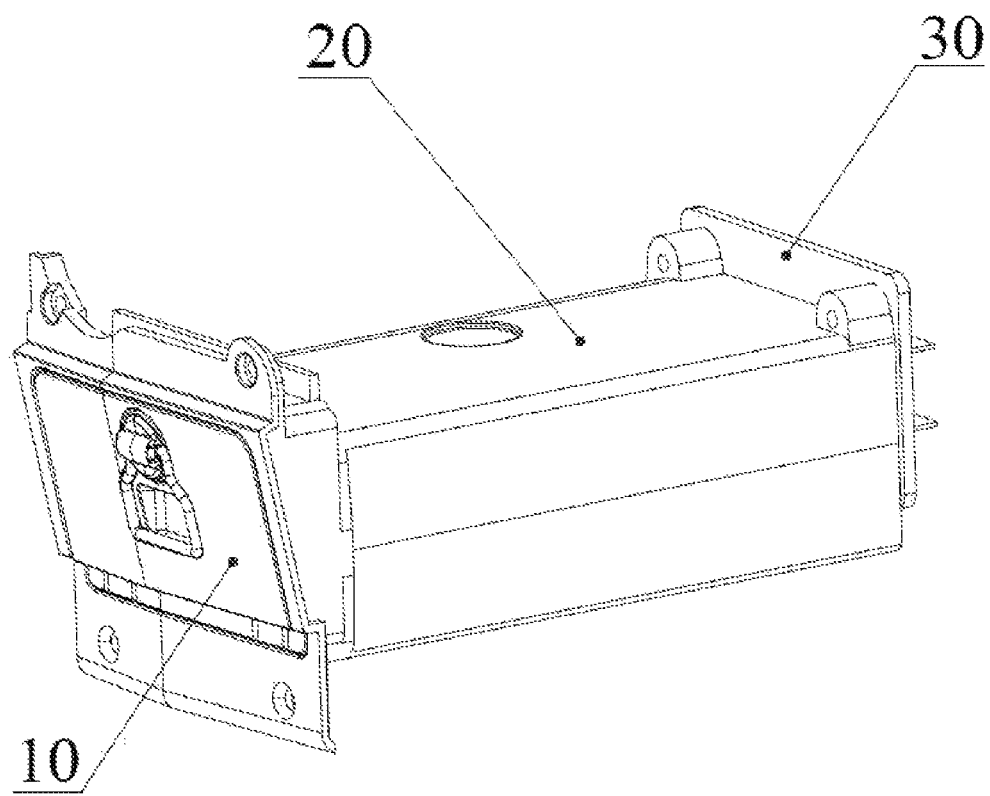
FIG. 1 is an isometric view of a battery case for a robot according to one embodiment.

This disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a battery case for a robot includes an end cap 10 and a housing 20. The end cap 10 includes a cap 11, a rotatable post 12, an elastic member 13 and a locking member 14. The housing 20 defines a chamber for receiving a battery 40 therein. The chamber has an open end. The cap 11 covers the open end. The rotatable post 12 rotatably passes through the cap 11 and extends into the chamber. The elastic member 13 is arranged around the rotatable post 12 and has an end abutting against the cap 11. The locking member 14 is connected to the rotatable post 12 at an end opposite the cap 11 and rotatable together with the rotatable post 12. In the embodiment, the locking member 14 is perpendicular to an axis of the rotatable post 12 that extends along a lengthwise direction thereof. The locking member 14 is rotatable between a first lock position (see FIG. 3) where the locking member 14 is engaged with housing 20, thus locking the end cap 10 to the housing 20, and a second unlock position where the locking member 14 is disengaged from the housing 20 thus allowing the end cap 10 to be removed from the housing 20.

In one embodiment, the cap 11 defines a though hole 111 through which the rotatable post 12 passes. The elastic member is arranged around the rotatable post 12, with one end abutting against the cap 22 and the other end fixed to the rotatable post 12 or abutting against the locking member 14. When attempting to rotate the rotatable post 12, a user needs to slightly press the external end of the rotatable post 12 so as to allow the free rotation of the locking member 14, which wilt be described below.

With such configuration, the end cap 10 can be attached to or detached from the housing 20, allowing the battery 40 to be removed front the battery case and then replaced with another battery when needed.

In one embodiment, the elastic member 13 is a spring. It should be noted that the elastic member 11 may be another resilient component such as a rubber component.

Figure 2:
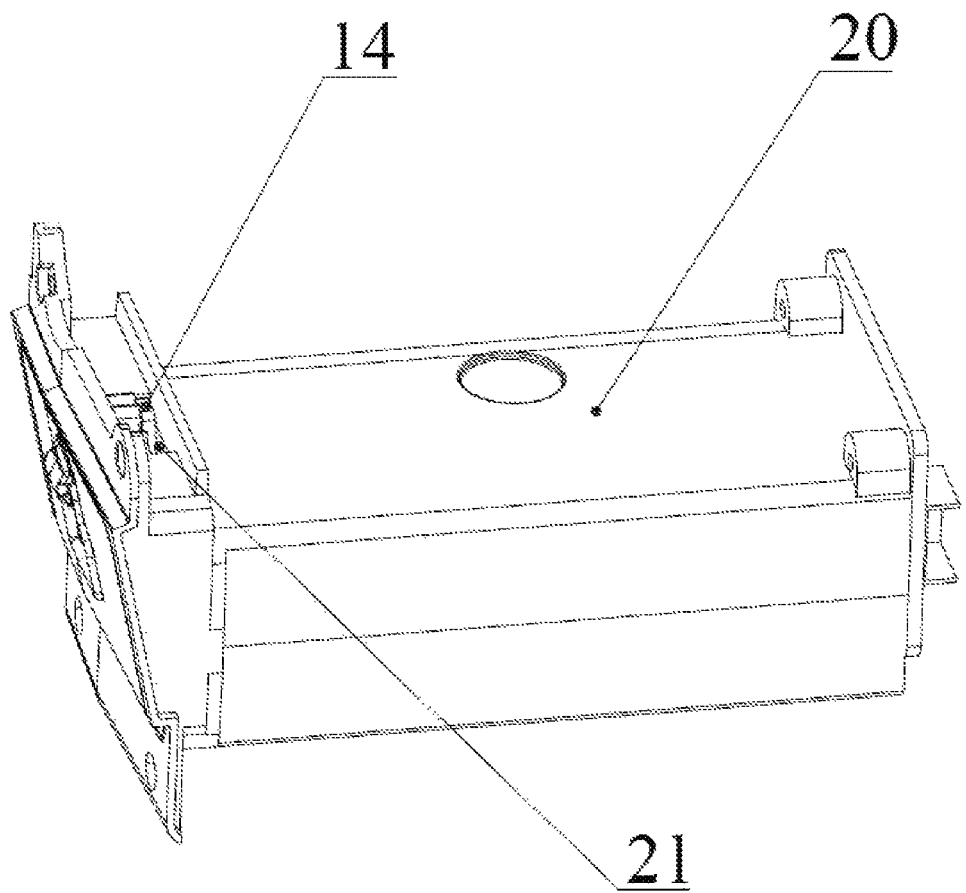
FIG. 2 is an isometric view of the battery case of FIG. 1, viewed from a different perspective.

In one embodiment, as shown in FIG. 2, the housing 20 defining a slot 21 adjacent to the open end. The slot 21 is used to receive an end of the locking member 14 when the locking member rotates to the lock position. After the press on the external end of the rotatable post 12 disappears, the elastic member 13 rebounds and cause the rotatable post 12 to move outwardly. The end of the locking member 14 thus abuts tightly against the side of the slot 21, thereby locking the end cap 10 to the housing 20.

In one embodiment, the end cap 10 further includes a ring pull 15 connected to an external end of the rotatable post 12. The in pull 15 is used to receive an external force from a user to press rotate the rotatable post 12. When the external end of the rotatable post 12 is pressed, the rotatable post 12 moves slight inward. The locking member 14 then comes out of contact with the side of the slot 21 and can then rotate freely.

In one embodiment, the ring pull 15 is rotatable connected to an outer end of the rotatable post 12. The cap 11 defines a recess 112 in an outer side thereof to receive the ring pull 15. The outer surface of the ring pull is substantially flush with the external side surface of the cap 11. The bottom of the recess 112 further defines a hollow space that allows the fingertip of a user to move therein to rotate the ring pull 15 out of the recess 112.

Figure 3:
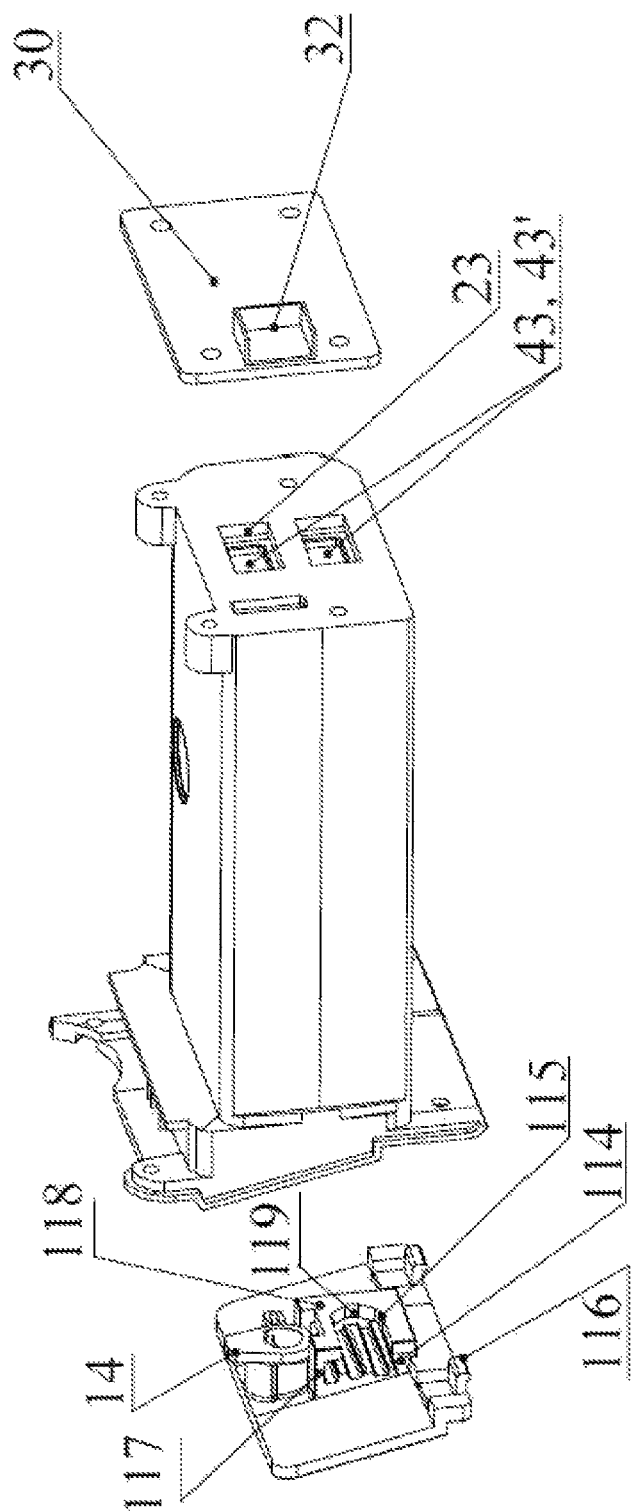
FIG. 3 is an isometric exploded view of the battery ease of FIG. 1.
Figure 4:
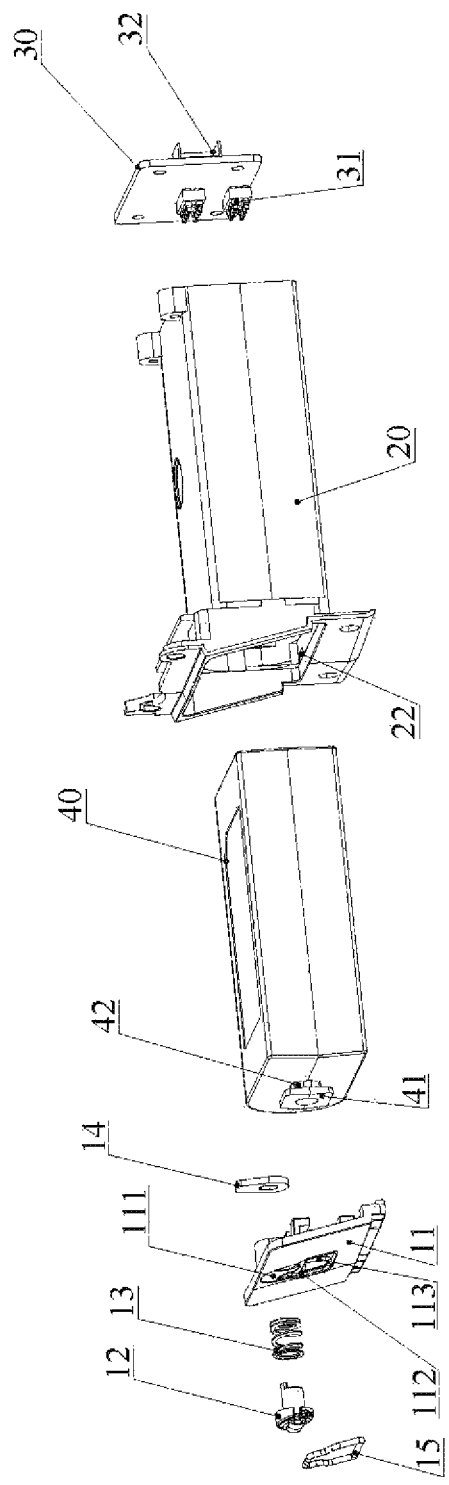
FIG. 4 is an isometric exploded view of the battery case of FIG. 1, viewed from a different perspective.

In one embodiment, as shown in FIGS. 3 and 4, the cap 11 further includes two projections 116 at an end opposite the rotatable post 12. The projections 116 are formed on an inner side of the cap 11, which faces the chamber of the housing 20. The housing 20 defines two holes 22 to respectively receive the projections 116 therein. The holes 22 are arranged and shaped corresponding to the projections 116 in such a way that when the projections 116 are completely fit in the holes 22, the movement of the cap 11 with respect to the housing 20 is limited.

In one embodiment, the battery 40 includes a positioning disc on one end thereof. The cap 11 includes a receiving portion 117 on an inner side thereof. The receiving portion is used to receive the positioning disc so as to position the battery 40. The positioning disc is at rectangular disc 41 and the battery 40 includes a connecting post 42 protruding from the end thereof. The positioning disc 41 is connected to the connecting post 42. The receiving, portion 117 includes a number of sidewalls 118 that corporately define a space 114 to receive the positioning disc 41 therein. A sidewall 118 of the receiving portion 117 defines a groove 119 to receive the connecting post 42. A projection 115 protrudes from a side of the groove 119. The connecting post 42 defines a notch to fit the projection 115 therein so as to hold the positioning disc 41 in position. When placing the battery 40 into the housing 20, the positioning disc 41 is first inserted into the space 114 and the battery 40 is then pushed into the chamber of the housing 20. During the pushing, the rotatable post 12 needs to be rotated to the unlock position by an external force from the ring pull 15 such that the battery post 40 can be completely pushed into the chamber of the housing 20. After the projections 116 are completely fit in the holes 22, the rotatable post 12 then is rotated to the lock position to lock the end cap 10 to the housing 20.

In one embodiment, the battery 40 a positive terminal 43 and a negative terminal 43' at an end opposite the positioning disc 41. The housing 20 further defines two through holes 23 through which the positive terminal 43 and the negative terminal 43' are connected to an external load.

In one embodiment, the battery case further includes a circuit board 30 fixed to the housing 20 at an end opposite the end cap 11 via screws. The circuit board 30 is electrically connected to the battery 40. The circuit board 30 includes two set of retractable pins 31 that are respectively arranged corresponding to and abut against the positive terminal 43 and the negative terminal 4 and, a port 32 that is used to connect with an external circuit. By using the retractable pins 31 to connect with the positive terminal 43 and the negative terminal 43', the battery 40 is allowed to have dimensional tolerances within a certain range, which improves connection reliability.

Figure 5:
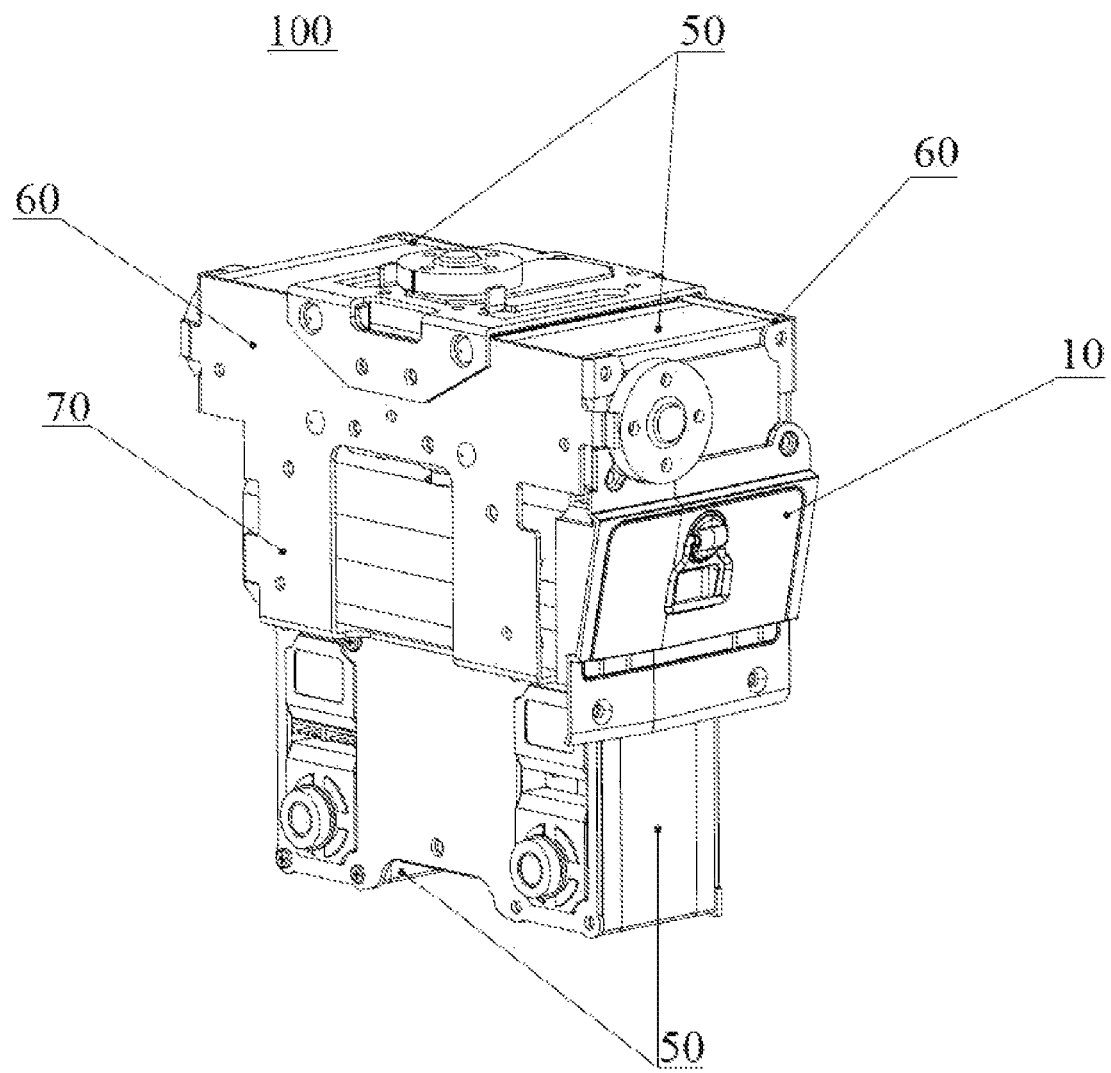
FIG. 5 is an isometric view of an assembly of a robot according to one embodiment.

A robot 100 according to an embodiment includes a battery case as described above. FIG. 5 shows a torso portion 70 of the robot 100, including a frame 60 constructed by a number of interconnected sheet metals and a neck servo 50, two shoulder servos 50 and two leg servos 50 connected to the frame. The battery case is arranged between the shoulder servos 50 and the leg servos 50. With the battery case installed in the robot 100, a drained battery can be easily removed from the robot 100 and replaced With a fully charged battery, which allows the robot 100 to operate without delays.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An assembly comprising:
   a torso portion of a robot; and
   a battery case arranged in the torso portion, the battery case comprising a housing and an end cap, the housing defining a chamber for receiving a battery therein, the chamber having an open end, the end cap comprising a cap that is configured to cover the open end, a rotatable post rotatably passing through the cap and extending into the chamber, an elastic member arranged around the rotatable post and comprising an end abutting against the cap, and a locking member connected to the rotatable post and rotatable together with the rotatable post to a position where the locking member is engaged with the housing, thus locking the cap to the housing.

2. The assembly according to claim 1, wherein the housing defining a slot adjacent to the open end, the slot is configured to receive an end of the locking member when the locking member rotates to the position.

3. The assembly according to claim 1, wherein the end cap further comprising a ring pull connected to the rotatable post, the ring pull is configured to receive an external force to rotate the rotatable post.

4. The assembly according to claim 3, wherein the ring pull is rotatable connected to an outer end of the rotatable post, the cap defines a recess to receive the ring pull.

5. The assembly according to claim 1, wherein the cap comprises one or more projections at an end opposite the rotatable post, and the housing defines one or more holes to receive the one or more projections therein.

6. The assembly according to claim 1, wherein the battery comprises a positioning disc on one end thereof, and the cap comprises a receiving portion on an inner side thereof, the receiving portion is configured to receive the positioning disc so as to position the battery.

7. The assembly according to claim 6, wherein the positioning disc is rectangular and the battery comprises a connecting post protruding from the end thereof, the positioning disc is connected to the connecting post, the receiving portion defines a groove to receive the connecting post and comprises a projection protruding from a side of the groove, the connecting post defines a notch to fit the projection therein so as to hold the positioning disc in position.

8. The assembly according to claim 1, wherein the battery comprises a positive terminal and a net terminal at an end opposite the positioning disc, the housing defines two through holes through which the positive terminal and the negative terminal are connected to an external load.

9. The assembly according to claim 8, further comprising a circuit board fixed to the housing at an end of the end cap, wherein the circuit board is electrically connected to the battery, the circuit board comprises two set of retractable pins that are respectively arranged corresponding to and abut against the positive terminal and the negative terminal and a port configured to connect with an external circuit.

10. A robot comprising:
    a torso portion; and
    a battery case arranged in the torso portion, the battery case comprising a housing and an end cap, the housing defining a chamber for receiving a battery therein, the chamber having an open end, the end cap comprising a cap that is configured to cover the open end, a rotatable post rotatably passing through the cap and extending into the chamber, an elastic member arranged around the rotatable post and comprising an end abutting against the cap, and a locking member connected to the rotatable post and rotatable together with the rotatable post to a position where the locking member is engaged with the housing, thus kicking the cap to the housing.

* * * * *